H. C. KOCHENSPERGER.
Carriage-Brake.

No. 65,236.

Patented May 28, 1867.

Witnesses:
A. Wickham Hore
R. H. Seaton

Inventor:
Henry C. Kochensperger
By How & Weston
Attys

United States Patent Office.

HENRY C. KOCHENSPERGER, OF THORNVILLE, OHIO.

Letters Patent No. 65,236, dated May 28, 1867.

IMPROVEMENT IN HOLDER AND SEAT FOR WAGON-BRAKES.

*The Schedule referred to in these Letters Patent and making part of the same.*

---

Specification of certain Improvements in a Brake Rubber-Holder or Seat, invented by HENRY C. KOCHENSPERGER, of Thornville, in the county of Perry, and State of Ohio.

My invention consists of a cast-iron or wrought-iron seat or holder, so formed that it may readily be attached to the brake-bar, and also that the rubber, or piece which rubs against the wheel, may readily be secured in place, or removed when worn out, as hereinafter fully explained and described. In the accompanying drawings—

Figure 1:
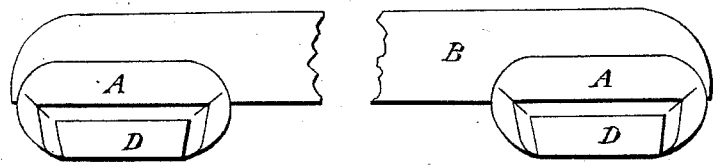
Figure 1 is a top view of a brake-bar, with a pair of my rubber-holders attached, the centre of the bar being broken away to save space on the sheet.
Figure 2:
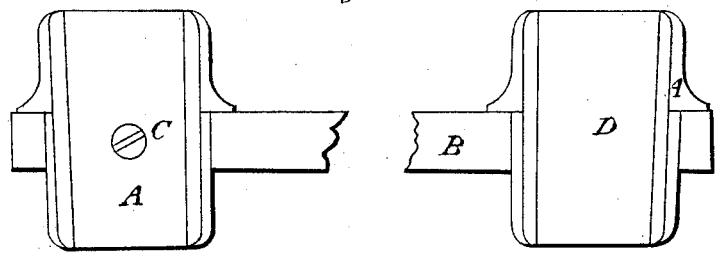
Figure 2 is a rear view of the same.
Figure 3:
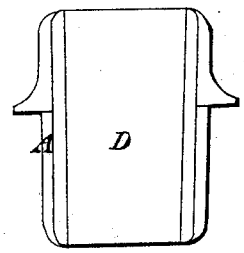
Figure 3 is a rear view of a holder and rubber detached from the bar.
Figure 4:
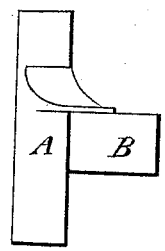
Figure 4 is a side view of a holder, showing the end of the bar to which the said holder is attached.

A is the holder, B the brake-bar, and C the screw which secures the holder to the bar. The holder is of cast iron or other suitable material, and has a recess or opening, $b$, in it, which serves as a seat or bed for the rubber D. This recess is made wider at the rear than at the front, after the manner of a dove-tail, and tapers towards the bottom, similar to the frustum of a pyramid inverted. A flange, $a$, is cast on the rear or rear and sides of the holder, which flange prevents the holder from twisting around or slipping down. The screw C passes through the back of the holder, into which its head is countersunk, and enters the bar B, thus firmly securing the holder to the bar. Into the recess $b$ in the holder is fitted the rubber D, which is made of wood or other material suitable for the purpose, and is put in from the top, and set snugly to its place. If desired, a screw or pin may be passed through it, to secure it in its place more effectually. The holder is so cast that it shall slope outward at the top more or less, to adapt it to the flare of the wheels against which the rubber is to work. Consequently, in such cases, two patterns must be used, so as to make the holders "rights and lefts."

In the construction of brakes for wagons, cars, or wheeled vehicles, as commonly used, the rubber, or part which is applied to or against the wheel, to retard or stop the vehicle by the friction thus produced, is bolted or otherwise fastened directly to the brake-bar, and when it becomes too much worn to operate efficiently, it has to be refaced or removed, and its place supplied by a new rubber or block, which is an expensive and tedious operation. In my invention I furnish a remedy for these evils, or reduce them to as small an amount as possible, and provide a rubber which may be readily removed or replaced, and a holder which may be quickly, cheaply, and securely fastened to the brake-bar.

Having thus fully described my invention, I claim—

1. The holder A, constructed substantially as described, in combination with the brake-bar or its equivalent, as set forth.

2. The combination of the holder A and rubber D, substantially as and for the purpose specified.

HENRY C. KOCHENSPERGER.

Witnesses:
JACOB DUNWOODY,
JNO. H. JEFFERSON.